United States Patent
Palero et al.

(10) Patent No.: US 11,700,462 B2
(45) Date of Patent: Jul. 11, 2023

(54) SYSTEM FOR PERFORMING AMBIENT LIGHT IMAGE CORRECTION

(71) Applicant: KONINKLIJKE PHILIPS N.V., Eindhoven (NL)

(72) Inventors: Jonathan Alambra Palero, Waalre (NL); Yannyk Parulian Julian Bourquin, Eindhoven (NL); Rieko Verhagen, Vught (NL); Kiran Kumar Thumma, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/771,513

(22) PCT Filed: Oct. 30, 2020

(86) PCT No.: PCT/EP2020/080501
§ 371 (c)(1),
(2) Date: Apr. 25, 2022

(87) PCT Pub. No.: WO2021/089422
PCT Pub. Date: May 14, 2021

(65) Prior Publication Data
US 2022/0400221 A1 Dec. 15, 2022

(30) Foreign Application Priority Data
Nov. 6, 2019 (EP) .................... 19207439

(51) Int. Cl.
*H04N 7/18* (2006.01)
*H04N 25/531* (2023.01)
(Continued)

(52) U.S. Cl.
CPC ........... *H04N 25/531* (2023.01); *H04N 23/56* (2023.01); *H04N 23/74* (2023.01)

(58) Field of Classification Search
CPC ...... H04N 25/531; H04N 23/56; H04N 23/74; H04N 23/611; H04N 23/743; H04N 7/18
See application file for complete search history.

(56) References Cited

U.S. PATENT DOCUMENTS 7,305,108 B2   12/2007   Waehner
8,752,768 B2    6/2014   Gao
(Continued)

FOREIGN PATENT DOCUMENTS

CN    101931755 B    12/2010
WO    2012172360 A2  12/2012
(Continued)

OTHER PUBLICATIONS

International Search Report and Written Opinion Dated Jan. 13, 2021 For International Application No. PCT/EP2020/080501 Filed Oct. 30, 2020.

(Continued)

*Primary Examiner* — Yogesh K Aggarwal (57) ABSTRACT

There is provided a system for performing ambient light image correction. The system comprises a light source, a rolling shutter imaging unit configured to capture a plurality of images of the object at an exposure time shorter than the wave period of the pulsed illumination from the light source, and a control unit configured to generate a first composite image comprising a plurality of bright bands from the plurality of captured images by combining sections from the plurality of captured images which correspond to bright bands, generate a second composite image comprising a plurality of dark bands from the plurality of captured images by combining sections from the plurality of captured images which correspond to dark bands, and generate an ambient (Continued)

light corrected image based on a difference in pixel information between the first composite image and the second composite image.

13 Claims, 7 Drawing Sheets

(51) Int. Cl.
*H04N 23/56* (2023.01)
*H04N 23/74* (2023.01)

(56) References Cited

U.S. PATENT DOCUMENTS

| | | | |
|---|---|---|---|
| 9,965,672 B2 | 5/2018 | Hanna | |
| 2005/0093997 A1 | 5/2005 | Dalton | |
| 2010/0026853 A1 | 2/2010 | Mokhnatyuk | |
| 2013/0072771 A1* | 3/2013 | Gu | G06F 3/0425 600/479 |
| 2013/0093921 A1* | 4/2013 | Liao | G06F 3/04184 348/241 |
| 2017/0286792 A1 | 10/2017 | Ackerman | |

FOREIGN PATENT DOCUMENTS

| | | |
|---|---|---|
| WO | 2017172695 A1 | 10/2017 |
| WO | 2018/145030 A1 | 8/2018 |

OTHER PUBLICATIONS

Kolaman, et al: "Light source separation from image sequences of oscillating lights," in Electrical & Electronics Engineers in Israel (IEEEI), 2014 IEEE 28th Convention of. IEEE, 2014, pp. 1-5.

Gu, et al.: "Multiplexed illumination for scene recovery in the presence of global illumination," in Computer Vision (ICCV), 2011 IEEE International Conference on. IEEE, 2011, pp. 691-698.

O'Toole, et al: "Homogeneous codes for energy-efficient illumination and imaging," ACM Transactions on Graphics (TOG), vol. 34, No. 4, p. 35, 2015.

Schechner, et al: "A theory of multiplexed illumination," in Computer Vision, 2003. Proceedings. Ninth IEEE International Conference on. IEEE, 2003, pp. 808-815.

\* cited by examiner

SYSTEM FOR PERFORMING AMBIENT LIGHT IMAGE CORRECTION

CROSS REFERENCE TO RELATED APPLICATIONS

This application is the U.S. National Phase application under 35 U.S.C. § 371 of International Application No. PCT/EP2020/080501 filed Oct. 30, 2020, which claims the benefit of European Patent Application Number 19207439.1 filed Nov. 6, 2019. These applications are hereby incorporated by reference herein.

FIELD OF THE INVENTION

The present disclosure relates to systems and methods for optical imaging, in particular to non-contact skin imaging systems and methods for performing ambient light image correction.

BACKGROUND OF THE INVENTION

There has been an increasing demand for non-obtrusive measurement and monitoring devices in the field of personal care and health application, particularly in skin sensing. Current available skin measurement systems provide skin quantification and skin feature monitoring functions that offer consumers information that may be too small to detect, too faint to notice, or too slow to follow. In order for these types of systems to be deemed usable by normal consumers, the embedded sensing functions should be sensitive as well as specific. In addition, the robustness of the relevant measurements is also essential in order to build consumer trust.

SUMMARY OF THE INVENTION

A critical issue in such imaging measurement systems is that when they are used in an uncontrolled environment, e.g. at home, there are typically inconsistencies in measurement due to undefined and potentially varying ambient lighting. There are ambient light removal techniques that are currently available, such as active illumination methods that involve controlled illumination to probe and infer scene properties maybe used. Also, some currently available techniques include controlled capture setups, e.g. a light stage, for capturing images of a person or a scene in all lighting directions (multiplexed illumination), and re-render photorealistic images under arbitrary illumination. Some other techniques rely on projector-camera systems for projecting structured patterns for subsequent image analysis. While active technique can enable high-quality illumination analysis and editing, these systems are typically complex and expensive. On the other hand, flash photography techniques offer ambient light removal by capturing two image of a scene, with and without flash illumination. These techniques have been used for image de-noising, de-blurring, artifact removal, non-photorealistic rendering, foreground segmentation, and matting.

The present disclosure offers techniques for robust imaging measurements of skin, particular for the face region, even when the ambient light is undefined and varying. This allows precise and accurate measurements of the facial skin that are appropriate for skin feature characterization and skin feature tracking. According to the present disclosure, an improved system for performing ambient light image correction, and a method for performing ambient light image correction are provided. In more detail, the present disclosure offers flicker-less and flash-less ambient light correction that can be performed at video rate, by using illumination pulsing above the flicker fusion threshold and a rolling shutter camera.

To better address one or more of the concerns mentioned earlier, in a first aspect, a system for performing ambient light image correction is provided. The system comprises: a light source configured to provide pulsed illumination to an object; a rolling shutter imaging unit configured to capture, while the object is illuminated by the pulsed illumination from the light source, a plurality of images of the object at an exposure time shorter than the wave period of the pulsed illumination, such that each of the plurality of captured images comprises a plurality of bright bands and dark bands, wherein a bright band corresponds to a high state of the pulsed illumination and a dark band corresponds to a low state of the pulsed illumination. The pulse frequency of the illumination provided by the light source is not a multiple integral of the frame rate at which the plurality of images are captured by the rolling shutter imaging unit. The system further comprises a control unit configured to: generate a first composite image comprising a plurality of bright bands from the plurality of captured images, by combining sections from the plurality of captured images which correspond to bright bands; generate a second composite image comprising a plurality of dark bands from the plurality of captured images, by combining sections from the plurality of captured images which correspond to dark bands; and generate an ambient light corrected image based on a difference in pixel information between the first composite image and the second composite image In some embodiments, the first composite image and the second composite image may be generated by applying an unmixing algorithm so as to separate pixels contained in the plurality of captured images on the basis of illumination state.

In some embodiments, the light source is configured to provide the illumination with a pulse frequency of at least 70 Hz. Also, in some embodiments, the rolling shutter imaging unit may be configured to capture the plurality of images at a frame rate of at least 30 frames per second.

In some embodiments, there may be provided a digital mirror device comprising: a reflective component; a base unit; and the system as described herein. In these embodiments, the light source of the system may be arranged adjacent to the reflective component, and the control unit of the system is positioned at the base unit of the digital mirror device.

In some embodiments, the digital mirror device may further comprise a user interface unit configured to receive user input. In these embodiments, the control unit is configured to: switch on the light source and the rolling shutter imaging unit upon receiving a first user input via the user interface unit; and control the rolling shutter imaging unit to capture the plurality of images of the object upon receiving a second user input via the user interface unit.

In some embodiment, the object may be the head of a subject, and in these embodiments the control unit of the system may be further configured to perform, based on the ambient light corrected image, at least one of face recognition of the subject and head orientation determination of the subject. Furthermore, the control unit of the system may be further configured to determine a facial feature of the subject based on results of at least one of the face recognition operation and the head orientation determination operation.

In some embodiments, the digital mirror device may further comprise an indication lighting unit configured to provide an indication light while the rolling shutter imaging unit captures the plurality of images.

In a second aspect, there is provided a method for performing ambient light image correction. The method comprises: providing pulsed illumination to an object; capturing, using a rolling shutter imaging unit, while the object is illuminated by the pulsed illumination from the light source, a plurality of images of the object at an exposure time shorter than the wave period of the pulsed illumination, such that each of the plurality of captured images comprises a plurality of bright bands and dark bands, wherein a bright band corresponds to a high state of the pulsed illumination and a dark band corresponds to a low state of the pulsed illumination, and wherein the pulse frequency of the illumination provided by the light source is not a multiple integral of the frame rate at which the plurality of images are captured; generating a first composite image comprising a plurality of bright bands from the plurality of captured images, by combining sections from the plurality of captured images which correspond to bright bands; generating a second composite image comprising a plurality of dark bands from the plurality of captured images, by combining sections from the plurality of captured images which correspond to dark bands; and generating an ambient light corrected image based on a difference in pixel information between the first composite image and the second composite image.

In some embodiments, generating the first composite image and the second composite image may comprise applying an unmixing algorithm so as to separate pixels contained in the plurality of captured images on the basis of illumination state.

In some embodiments, providing pulsed illumination to an object may comprise providing the pulsed illumination at a pulse frequency of at least 70 Hz. Also, in some embodiments, capturing the plurality of images may comprise capturing the plurality of images at a frame rate of at least 30 frames per second.

According to the aspects and embodiments described above, the limitations of existing techniques are addressed. In particular, the above-described aspects and embodiments enable flicker-less and flash-less ambient light correction to be performed, in particular at video rate. There is thus provided an improved system and method for ambient light image correction. These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF THE EMBODIMENTS

As noted above, there is provided an improved system and method which address the existing problems.

Figure 1:
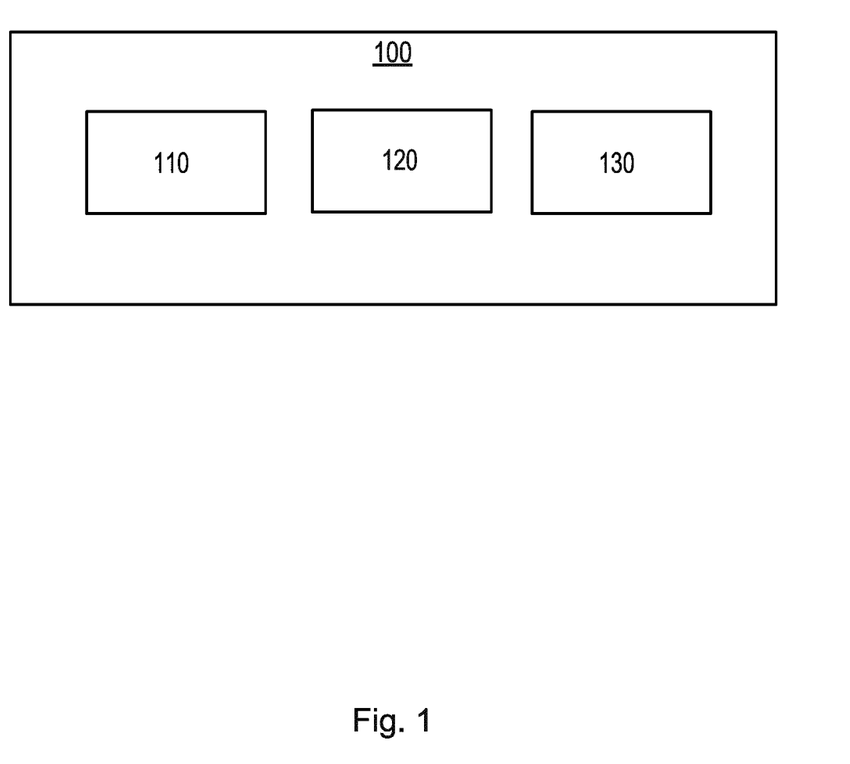
FIG. 1 is a block diagram of a system for ambient light image correction according to an embodiment.

FIG. 1 shows a block diagram of a system 100 according to an embodiment, which can be used for performing ambient light image correction. The system 100 comprises a light source 110, a rolling shutter imaging unit 120, and a control unit 130.

The light source 110 is configured to provide pulsed illumination to an object. In some embodiments, the light source 110 may be configured to provide the illumination with a pulse frequency of at least 70 Hz.

The rolling shutter imaging unit 120 is configured to capture, while the object is illuminated by the pulsed illumination from the light source 110, a plurality of images of the object at an exposure time shorter than the wave period of the pulsed illumination, such that each of the plurality of captured images comprises a plurality of bright bands and dark bands. A bright band corresponds to a high state of the pulsed illumination, and a dark band corresponds to a low state of the pulsed illumination. For purposes of illustration, an example of an image of an object captured under pulsed illumination is provided in FIG. 5A, where the captured image contains observed dark and light horizontal bands due to the frequency of the pulsed illumination being higher than the rate at which the rolling shutter imaging unit captures the image.

The pulse frequency of the illumination provided by the light source 110 is not a multiple integral of the frame rate at which the plurality of images are captured by the rolling shutter imaging unit 120. In some embodiments, the rolling shutter imaging unit 120 may be configured to capture the plurality of images at a frame rate of at least 30 frames per second.

The control unit 130 is configured to generate a first composite image by combining sections from the plurality of captured images which correspond to bright bands. The first composite image comprises a plurality of bright bands from the plurality of captured images. The control unit 130 is further configured to generate a second composite image by combining sections from the plurality of captured images which correspond to dark bands. The second composite image comprises a plurality of dark bands from the plurality of captured images. The control unit 130 is also further configured to generate an ambient light corrected image based on a difference in pixel information between the first composite image and the second composite image.

In some embodiments, the first composite image and the second composite image may be generated by applying an unmixing algorithm so as to separate pixels contained in the plurality of captured images on the basis of illumination state. An example of the unmixing algorithm will be explained in more detail below with reference to FIG. 7.

In general, the control unit 130 can control the operation of the system 100 and can implement the method described herein. The control unit 130 can comprise one or more processors, processing units, multi-core processor or modules that are configured or programmed to control the system 100 in the manner described herein. In particular implementations, the control unit 130 can comprise a plurality of software and/or hardware modules that are each configured to perform, or are for performing, individual or multiple steps of the method described herein.

In some embodiments, the system 100 may further comprise at least one user interface. Alternative or in addition, at least one user interface may be external to (i.e. separate to or remote from) the system 100. For example, at least one user interface may be part of another device. A user interface may be for use in providing a user of the system 100 with information resulting from the method described herein. Alternatively or in addition, a user interface may be configured to receive a user input. For example, a user interface may allow a user of the system 100 to manually enter instructions, data, or information. In these embodiments, the control unit 130 may be configured to acquire the user input from one or more user interface.

A user interface may be any user interface that enables the rendering (or output or display) of information to a user of the system 100. Alternatively or in addition, a user interface may be any user interface that enables a user of the system 100 to provide a user input, interact with and/or control the system 100. For example, the user interface may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, the system 100 may comprise a memory. Alternatively or in addition, one or more memories may be external to (i.e. separate to or remote from) the system 100. For example, one or more memories may be part of another device. A memory can be configured to store program code that can be executed by the control unit 130 to perform the method described herein. A memory can be used to store information, data, signals and measurements acquired or made by the control unit 130 of the system 100. For example, a memory may be used to store (for example, in a local file) the first composite image, the second composite image, and/or the ambient light corrected image. The control unit 130 may be configured to control a memory to store the first composite image, the second composite image, and/or the ambient light corrected image.

In some embodiments, the system 100 may comprise a communications interface (or circuitry) for enabling the system 100 to communicate with any interfaces, memories and/or devices that are internal or external to the system 100. The communications interface may communicate with any interfaces, memories and/or devices wirelessly or via a wired connection. For example, the communications interface may communicate with one or more user interfaces wirelessly or via a wired connection. Similarly, the communications interface may communicate with the one or more memories wirelessly or via a wired connection.

It will be appreciated that FIG. 1 only shows the components required to illustrate an aspect of the system 100 and, in a practical implementation, the system 100 may comprise alternative or additional components to those shown.

Figure 2:
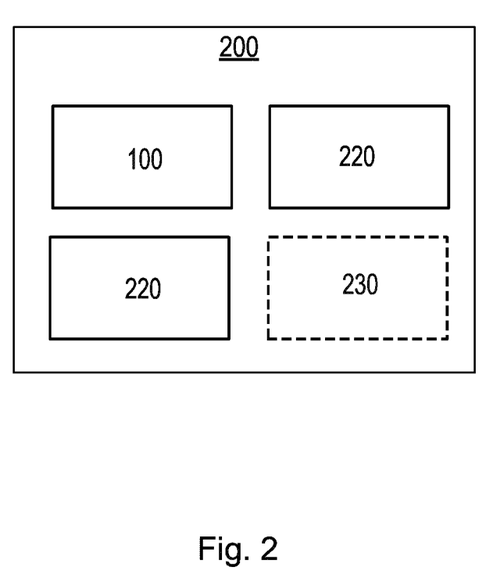
FIG. 2 is a block diagram of a digital mirror device 200 according to an embodiment.

FIG. 2 is a block diagram of a digital mirror device 200 according to an embodiment. The digital mirror device 200 comprises a reflective component 210, a base unit 220, and the system 100 as described with reference to FIG. 1 above. In the present embodiment, the light source 110 of the system 100 may be arranged adjacent to the reflective component 210, and the control unit 130 of the system 100 may be positioned at the base unit 220 of the digital mirror device 200.

In some embodiments, the digital mirror device 200 may further comprise a user interface unit 230, the user interface unit 230 being configured to receive user input. In these embodiments, the control unit 130 of the system 100 may be configured to switch on the light source 110 and the rolling shutter imaging unit 120 upon receiving a first user input via the user interface unit 230. Furthermore, the control unit 130 may be configured to control the rolling shutter imaging unit 120 to capture the plurality of images of the object upon receiving a second user input via the user interface unit 230.

In some embodiments, the object may be the head of a subject. In this case, the control unit 130 of the system may be further configured to perform, based on the ambient light corrected image generated by the control unit 130 of the system 100, at least one of face recognition of the subject and head orientation determination of the subject.

Although not shown in FIG. 2, in some embodiments the digital mirror device 200 may further comprise an indication lighting unit configured to provide an indication light while the rolling shutter imaging unit captures the plurality of images. The indication lighting unit may comprise a red LED light source, for example.

Figure 3:
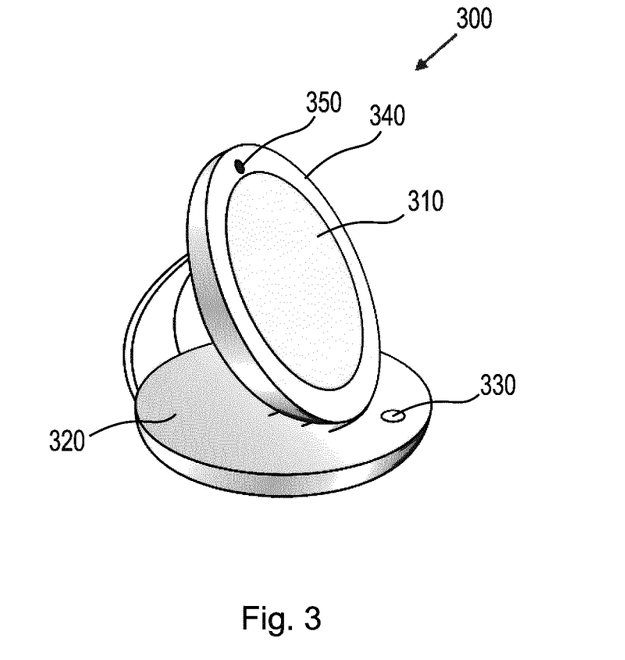
FIG. 3 shows a practical implemented embodiment of the digital mirror device as described with reference to FIG. 2.

A practical implemented embodiment of the digital mirror device as described above is further illustrated in FIG. 3. As shown in FIG. 3, the digital mirror device 300 comprises a reflective component 310 and a base unit 320. In this embodiment, the user interface unit 330 is provided in the form of an actuation button located at the base unit 320 for receiving user inputs. Furthermore, the light source 340 of the system included in the digital mirror device is provided around the periphery of the reflective component 310 in the form of a light ring, and the rolling shutter imaging unit 350 of the system included in the mirror device is provided above the reflective component 310. It will be appreciated that although the control unit of the system is not shown in FIG. 3, the component is included at the digital mirror device 300 (e.g. implemented as a processor contained inside the base unit 320).

In the present embodiment, the digital mirror device 300 (and specifically, the control unit of the system included in the digital mirror device 300) may be configured to switch on the light source 340 and the rolling shutter imaging unit 350 upon an initial actuation of the user interface unit 330 (e.g. pressing the button), and to control the rolling shutter imaging unit 350 to capture the plurality of images of the object (e.g. the face of a user) upon a subsequent actuation of the user interface unit 330 (e.g. pressing the button again). The control unit of the system included in the digital mirror device 300 can then generate a first composite image, generate a second composite image, and generate an ambient light corrected image as described with reference to FIG. 1 above. Furthermore, the control unit of the system included in the digital mirror device 300 can then perform, based on the generated ambient light corrected image, at least one of face recognition of the subject and head orientation determination of the subject.

As an example, upon receiving the corresponding user input(s), the rolling shutter imaging unit 350 may be configured to capture images at 30 frames per second, with an exposure value of −8 (equivalent to an exposure time of 3.9 ms), and the light source 340 may be configured to provide illumination at a pulse frequency of 93 Hz.

Since the system for performing ambient light image correction is implemented as the digital mirror device 300, during operation of the digital mirror device 300, images captured of a user's face can be corrected for ambient light while the user is able to observe their own reflection via the reflective component 310 (e.g. for personal grooming activities). Moreover, the ambient light corrected image(s) may be further analyzed for facial and skin features and/or irregularities, for example pimples, redness, hydration level, skin color, etc. This analyzation operation may be performed in real time. Moreover, this analyzation operation may be performed by the control unit of the system included in the digital mirror device 300 (or by a separate control unit or processor). Also, this analyzation operation may be triggered by a certain head orientation and/or a recognized face based on the face recognition and head orientation determination operations as discussed above.

Although not illustrated in FIG. 3, in some embodiments the digital mirror device 300 (or the system included in the device 300) may comprise a communications interface configured to communicate with external devices (e.g. a mobile phone). Therefore, in these embodiments, the analyzation results, for example the location of a pimple on the user's face, can be communicated to the mobile phone (e.g. via an application software installed on the mobile phone).

Figure 4:
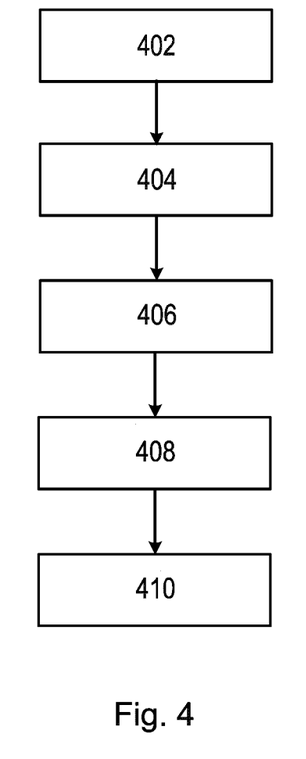
FIG. 4 illustrates a method for performing ambient light image correction according to an embodiment.

FIG. 4 illustrates a method for performing ambient light image correction according to an embodiment. The illustrated method can generally be performed by the system 100, and specifically in some embodiments by or under the control of control unit 130 of the system 100. For the purpose of illustration, at least some of the blocks of FIG. 4 will be described with reference to the various components of the system 100 of FIG. 1.

With reference to FIG. 4, at block 402, pulsed illumination is provided to an object. Specifically, the pulsed illumination may be provide by the light source 110 of the system 100. The pulse frequency of the provided illumination at block 402 may at least 70 Hz.

Returning to FIG. 4, at block 404, while the object is illuminated by the pulsed illumination (as described with reference to block 402), a plurality of images of the object are captured using a rolling shutter imaging unit at an exposure time shorter than the wave period of the pulsed illumination, such that each of the plurality of captured images comprises a plurality of bright bands and dark bands. In the present context, a bright band corresponds to a high state of the pulsed illumination and a dark band corresponds to a low state of the pulsed illumination. The pulse frequency of the illumination provided at block 402 is not a multiple integral of the frame rate at which the plurality of images are captured at block 404. The plurality of images may be captured by the rolling shutter imaging unit 120 of the system 100. In some embodiments, the plurality of images may be captured at block 404 at a frame rate of at least 30 frames per second.

Returning to FIG. 4, at block 406, a first composite image comprising a plurality of bright bands from the plurality of captured images is generated by combining sections from the plurality of captured images which correspond to bright bands. Specifically, the first composite image may be generated by the control unit 130 of the system 100.

Returning to FIG. 4, at block 408, a second composite image comprising a plurality of dark bands from the plurality of captured images is generated by combining sections from the plurality of captured images which correspond to dark bands. Specifically, the second composite image may be generated by the control unit 130 of the system.

In some embodiments, generating the first composite image at block 406 and the second composite image at block 408 may comprise applying an unmixing algorithm so as to separate pixels contained in the plurality of captured images on the basis of illumination state. An example of the unmixing algorithm will be explained in more detail below with reference to FIG. 7.

Returning to FIG. 4, at block 410, an ambient light corrected image is generated based on a difference in pixel information between the first composite image generated at block 406 and the second composite image generated at block 408. Specifically, the ambient light corrected image may be generated by the control unit 130 of the system 100.

Figure 5A:
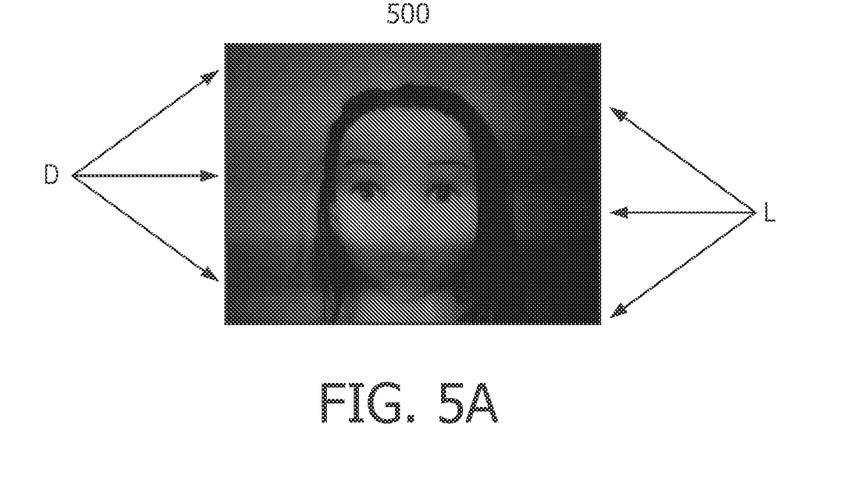
FIG. 5A shows an example of an image of an object while the object is illuminated by pulsed illumination FIG. 5B demonstrates how light and dark bands in images vary according to different exposure times of the imaging unit.

FIG. 5A shows an example of an image of an object while the object is illuminated by pulsed illumination. As explained above with reference to FIG. 1, when the frequency of the pulsed illumination is higher than the rate at which the rolling shutter imaging unit captures the image 500, dark and light horizontal bands can be observed in the captured image 500. In the example shown in FIG. 5A, the horizontal bright bands are labelled as L while the horizontal dark bands are labelled as D.

Figure 5B:
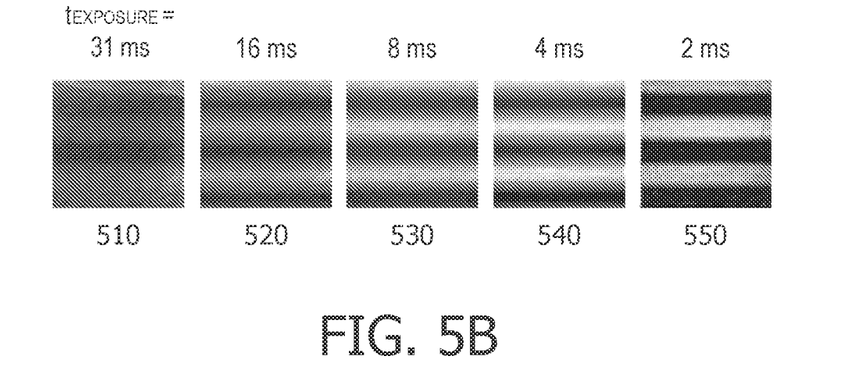

It is further observed that when the exposure time of the imaging unit is reduced, the contrast and the slope of the edge between the light and dark bands increase as demonstrated in the plurality of images shown in FIG. 5B. The first image 510 of FIG. 5B is captured at an exposure time of 31 ms, the second image 520 is captured at an exposure time of 16 ms, the third image 530 is captured at an exposure time of 8 ms, the fourth image 540 is captured at an exposure time of 4 ms, and the fifth image 550 is captured at an exposure time of 2 ms. It can be seen from the first image 510 to the fifth image 550 that as the exposure time decreases, the distinction between the light and dark bands in the image becomes sharper. Based on this information as well as basic camera knowledge, it would be advantageous to extract information with respect to ambient light during the low state of pulsed illumination when the exposure time is shorter than the wave period of the pulsed illumination.

Figure 6:
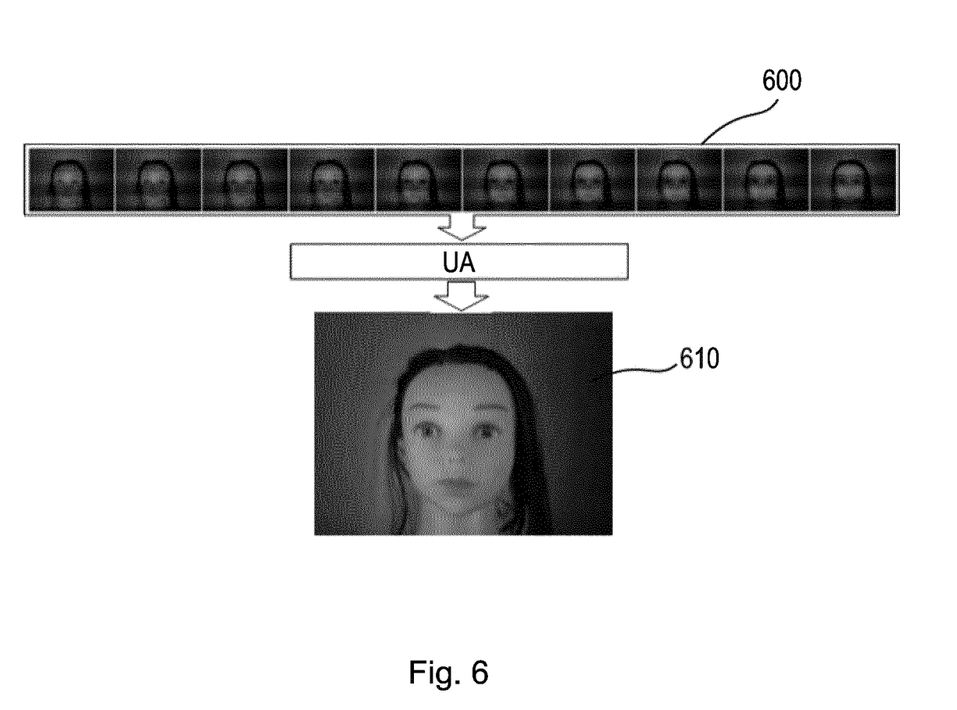
FIG. 6 is a schematic diagram of the generation of an ambient light corrected image from a plurality of captured images.

FIG. 6 is a schematic diagram of the generation of an ambient light corrected image from a plurality of captured images. It is shown in the drawing that the plurality of images 600, which are captured by a rolling shutter imaging unit, can be transformed into an ambient light corrected image 610 after undergoing the operations of the unmixing algorithm UA. More specifically, the drifting light and dark bands in the plurality of images 600 of FIG. 6 can be separated for the generation of composite images and subsequently generation of an ambient light corrected image, using the unmixing algorithm UA. To explain the unmixing algorithm in more detail, an example of the algorithm for separating pixels contained in the plurality of captured images on the basis of illumination state and generate an ambient light corrected image according to an embodiment is illustrated in the flowchart of FIG. 7.

Figure 7:
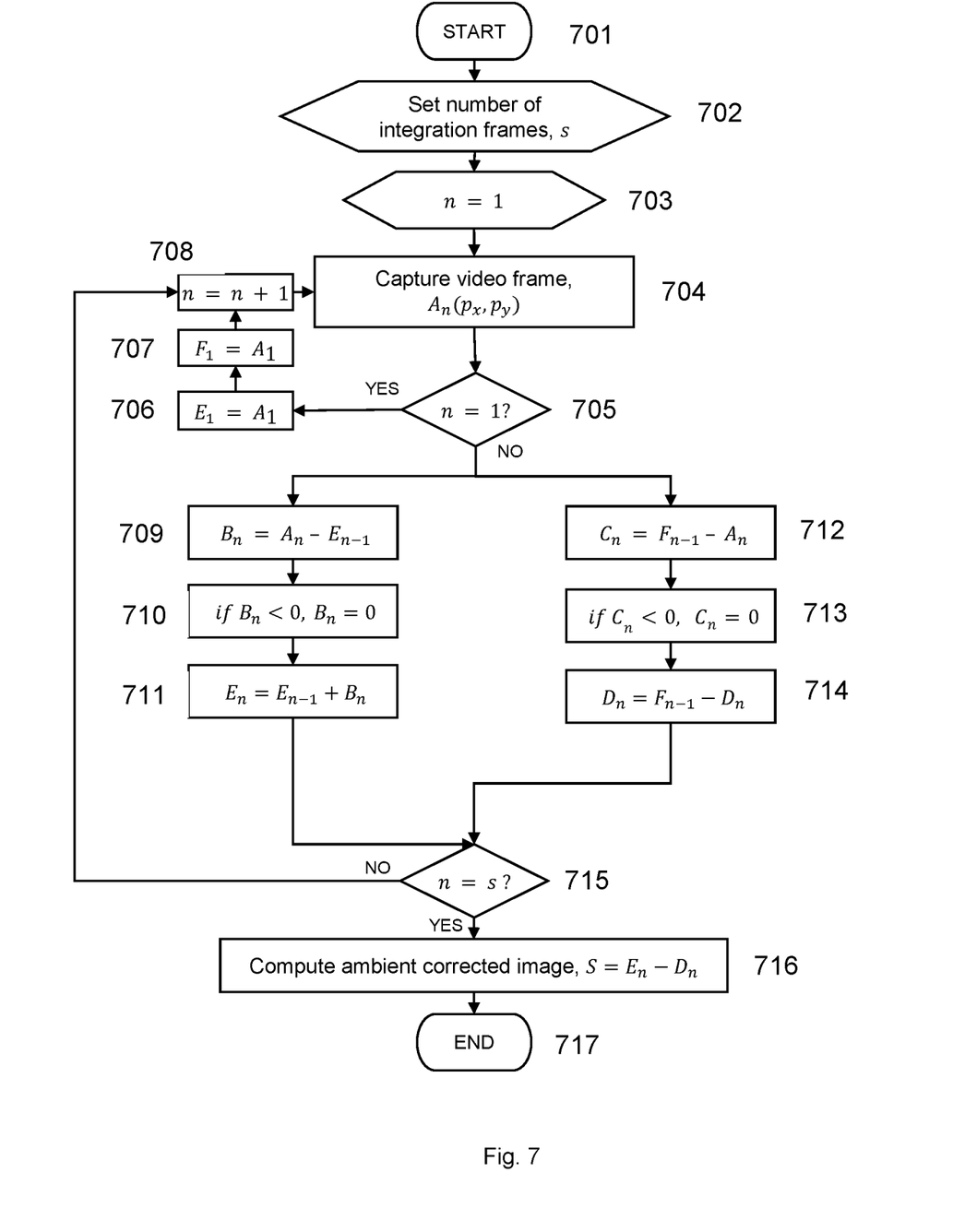
FIG. 7 is a flowchart illustrating an unmixing algorithm for separating pixels contained in the plurality of captured images on the basis of illumination state and generate an ambient light corrected image, according to an embodiment.

The unmixing algorithm 700 of FIG. 7 is presented as a series of method steps which can be performed by the control unit 130 of the system 100 as described with reference to FIG. 1. For the purpose of illustration, the method will be described below with reference to various components of the system 100.

The method for the unmixing algorithm begins at step 701.

At step 702, a number of integration frames s are set by the control unit 130, where s>1. The number of integration frames correspond to the number of the plurality of images to be captured by the rolling shutter imaging unit 120 of the system 100. For example, if ten images are to be captured by the rolling shutter imaging unit 120 (and subsequently to be "integrated" as a single composite image), the number of integration frames s is set as 10.

Subsequently, at step 703, counter value n is set at 1.

Subsequently, at step 704, a video frame $A_n$ ($p_x,p_y$) corresponding to the current counter value n is captured by the rolling shutter imaging unit 120 of the system 100. In this embodiment, the captured video frame $A_n$ ($p_x,p_y$) is free from any image pixel value nonlinearity, which is usually a result of gamma correction that is (automatically) carried out at imaging units such as camera systems. If gamma correction is applied by the rolling shutter imaging unit 120, inverse gamma correction should be applied to all video frames before the method proceeds further. Therefore, although not shown in FIG. 7, in some embodiments the method may include a step of performing inverse gamma correction for the captured video frame $A_n$ ($p_x,p_y$) subsequent to step 704. In the context of the present disclosure, a video frame corresponds to a single image. Each image ("video frame") in the present embodiment is characterized by the pixels contained in the respective image, as represented by the symbols $p_x$ and $p_y$.

Subsequently, at step 705, it is determined whether the counter value n is 1. This determination may be performed by the control unit 130 of the system.

If the counter value n is 1, the method proceeds to step 706, step 707, and step 708 in which the value of $E_1$ is set as the video frame $A_1$ which is captured at step 704, the value of $F_1$ is set as the video frame $A_1$ which is captured at step 704, and the counter value n is incremented by 1 (represented by the equation "n=n+1").

After performing steps 706 to 708, the method returns to step 704 at which a video frame $A_n$ ($p_x,p_y$) corresponding to the current counter value n is captured by the rolling shutter imaging unit 120 of the system 100. For example, directly after performing steps 706 to 708 subsequent to determining that n=1 at step 705, the video frame $A_2$ is captured upon returning to step 704.

Subsequent to step 704, it is determined again whether the counter value n is 1 at step 705. If the counter value n is not 1, the method proceeds to steps 709 to 714. In more detail, at step 709, the value of $B_n$ is set as the current value of $A_n$ subtracted by the current value of $E_{n-1}$ (represented by "$B_n=A_n-E_{n-1}$"). Subsequently, at step 710, if the current value of $B_n$ is smaller than 0, the new value of $B_n$ is set as 0. Subsequently, at step 711, the new value of $E_n$ is set as the sum of the current value of $E_{n-1}$ and the current value of $B_n$ (represented by "$E_n=E_{n-1}+B_n$").

At step 712, the value of $C_n$ is set as the current value of Fn-1 subtracted by the current value of An (represented by "$C_n=F_{n-1}-A_n$"). Subsequently, at step 713, if the current value of $C_n$ is smaller than 0, the new value of $C_n$ is set as 0. Subsequently, at step 714, the new value of $D_n$ is set as current value of $Fn_{n-1}$ subtracted by the current value of $D_n$.

After performing steps 709 to 714, the method proceeds to step 715 at which it is determined whether the current counter value n equals to the number of integration frames s set at step 702. If is determined that the current counter value n does not equal to the number of integration frames s, the method returns to step 708 at which the counter value n is incremented by 1, and subsequently to step 704 at which a video frame $A_n$ ($p_x,p_y$) corresponding to the current counter value n is captured by the rolling shutter imaging unit 120 of the system 100. Hence, by determining whether the current counter value n equals to the number of integration frames s at step 715, the algorithm ensures that steps 704 and 709 to 714 are performed for each incremental value of n until the current counter value n equals to the number of integration frames s. The operation at steps 709 to 714 allows generation of a first composite image and a second composite image, which is represented by $E_n$ and $D_n$ after the last iteration of steps 709 to 714. The first composite image $E_n$ in this case comprises the bright bands from the plurality of images (i.e. captured video frames), and the second composite image $D_n$ in this case comprises the dark bands from the plurality of images.

If it is determined that the current counter value n equals to the number of integration frames s at step 715, the method proceeds to step 716 at which the ambient light corrected image S is generated by performing a subtraction operation between the first composite image En and the second composite image $D_n$. The method then ends at step 717.

It will be appreciated that in other embodiments the unmixing algorithm can be implemented in other ways, such as by taking maxima and minima pixel values from the plurality of captured images. For example, steps 709 to 711 can be implemented as $E_n$=maxima ($E_{n-1}$, $A_n$) while steps 712 to 714 can be implemented as $E_n$=minima ($E_{n-1}$, $A_n$), where the operators maxima and minima involves a comparative operation between each image pixel value and extracting the maximum pixel values and minimum values, respectively. Alternative to an iterative process, the maxima and minima operators can be implemented to all video frames within the set number of integration frames, at once.

There is thus provided an improved system and method for performing ambient light image correction, which overcome the existing problems.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A system for performing ambient light image correction, the system comprising:
   a light source configured to provide pulsed illumination to an object;
   a rolling shutter imaging unit configured to capture, while the object is illuminated by the pulsed illumination from the light source, a plurality of images of the object at an exposure time shorter than a wave period of the pulsed illumination, such that each of the plurality of captured images comprises a plurality of bright bands and a plurality of dark bands, wherein a bright band corresponds to a high state of the pulsed illumination and a dark band corresponds to a low state of the pulsed illumination;
   wherein a pulse frequency of the illumination provided by the light source is not a multiple integral of a frame rate at which the plurality of images are captured by the rolling shutter imaging unit, and wherein the system further comprises a control unit configured to:
  generate a first composite image comprising the plurality of bright bands from the plurality of captured images, by combining sections from the plurality of captured images which correspond to bright bands;
  generate a second composite image comprising the plurality of dark bands from the plurality of captured images, by combining sections from the plurality of captured images which correspond to dark bands; and
  generate an ambient light corrected image based on a difference in pixel information between the first composite image and the second composite image.

2. The system according to claim 1, wherein the first composite image and the second composite image are generated by applying an unmixing algorithm so as to separate pixels contained in the plurality of captured images on the basis of illumination state.

3. The system according to claim 1, wherein the light source is configured to provide the illumination with a pulse frequency of at least 70 Hz.

4. The system according to claim 1, wherein the rolling shutter imaging unit is configured to capture the plurality of images at the frame rate of at least 30 frames per second.

5. A digital mirror device comprising:
  a reflective component;
  a base unit; and
  the system according to claim 1,
  wherein the light source of the system is arranged adjacent to the reflective component, and the control unit of the system is positioned at the base unit of the digital mirror device.

6. The digital mirror device according to claim 5, further comprising a user interface unit configured to receive user input,
  wherein the control unit is configured to:
    switch on the light source and the rolling shutter imaging unit upon receiving a first user input via the user interface unit; and
    control the rolling shutter imaging unit to capture the plurality of images of the object upon receiving a second user input via the user interface unit.

7. The digital mirror device according to claim 5, wherein the object is the head of a subject, and wherein the control unit of the system is further configured to perform, based on the ambient light corrected image, one or both of face recognition of the subject and head orientation determination of the subject.

8. The digital mirror device according to claim 7, wherein the control unit of the system is further configured to determine a facial feature of the subject based on results of at least one of the face recognition operation and/or the head orientation determination operation.

9. The digital mirror device according to claim 5, further comprising an indication lighting unit configured to provide an indication light while the rolling shutter imaging unit captures the plurality of images.

10. A method for performing ambient light image correction, the method comprising:
  providing pulsed illumination to an object;
  capturing, using a rolling shutter imaging unit, while the object is illuminated by the pulsed illumination from the light source, a plurality of images of the object at an exposure time shorter than a wave period of the pulsed illumination, such that each of the plurality of captured images comprises a plurality of bright bands and a plurality of dark bands, wherein a bright band corresponds to a high state of the pulsed illumination and a dark band corresponds to a low state of the pulsed illumination, and wherein a pulse frequency of the illumination provided by the light source is not a multiple integral of a frame rate at which the plurality of images are captured;
  generating a first composite image comprising the plurality of bright bands from the plurality of captured images, by combining sections from the plurality of captured images which correspond to bright bands;
  generating a second composite image comprising the plurality of dark bands from the plurality of captured images, by combining sections from the plurality of captured images which correspond to dark bands; and
  generating an ambient light corrected image based on a difference in pixel information between the first composite image and the second composite image.

11. The method according to claim 10, wherein generating the first composite image and the second composite image comprises applying an unmixing algorithm so as to separate pixels contained in the plurality of captured images on the basis of illumination state.

12. The method according to claim 10, wherein providing pulsed illumination to an object comprises providing the pulsed illumination at a pulse frequency of at least 70 Hz.

13. The method according to claim 10, wherein capturing the plurality of images comprises capturing the plurality of images at the frame rate of at least 30 frames per second.

* * * * *